US012582110B2

(12) United States Patent
Miller

(10) Patent No.: US 12,582,110 B2
(45) Date of Patent: Mar. 24, 2026

(54) YELLOW JACKET BAIT BOTTLE SYSTEM AND METHOD

(71) Applicant: Armed Force Pest Control, Inc., Middletown, CA (US)

(72) Inventor: Sarah Miller, Hidden Valley Lake, CA (US)

(73) Assignee: Armed Force Pest Control, Inc., Middletown, CA (US)

( * ) Notice: Subject to any disclaimer, the term of this patent is extended or adjusted under 35 U.S.C. 154(b) by 0 days.

(21) Appl. No.: 18/909,255

(22) Filed: Oct. 8, 2024

(65) Prior Publication Data

US 2025/0024825 A1    Jan. 23, 2025

Related U.S. Application Data

(63) Continuation-in-part of application No. 29/895,521, filed on Jun. 22, 2023, now Pat. No. Des. 1,080,798.

(51) Int. Cl.
   *A01M 1/20*     (2006.01)
   *A01M 1/02*     (2006.01)
(52) U.S. Cl.
   CPC ............ *A01M 1/2016* (2013.01); *A01M 1/02* (2013.01); *A01M 2200/012* (2013.01)
(58) Field of Classification Search
   CPC ........ A01M 1/02; A01M 1/20; A01M 1/2005; A01M 1/2011; A01M 1/2016; B65D 47/20; B65D 35/02
   See application file for complete search history.

(56) References Cited

U.S. PATENT DOCUMENTS

| | | | | |
|---|---|---|---|---|
| 4,577,434 | A * | 3/1986 | Davis | A01M 1/14 |
| | | | | 43/115 |
| 7,861,873 | B1 * | 1/2011 | Bragg | B65D 43/16 |
| | | | | 215/237 |
| 2002/0148157 | A1 * | 10/2002 | Rollins | A01M 1/20 |
| | | | | 43/132.1 |
| 2014/0027530 | A1 * | 1/2014 | Cao | A61L 9/12 |
| | | | | 239/6 |
| 2015/0224497 | A1 * | 8/2015 | Furrer | B01L 3/00 |
| 2017/0210520 | A1 * | 7/2017 | Woodward | B65D 50/00 |
| 2018/0014526 | A1 * | 1/2018 | Hirsch | A01M 13/00 |
| 2018/0132468 | A1 * | 5/2018 | Cink | A01M 1/02 |
| 2018/0325088 | A1 * | 11/2018 | Willert | A01M 1/10 |

* cited by examiner

*Primary Examiner* — Joshua J Michener
*Assistant Examiner* — Henry Hooper Mudd
(74) *Attorney, Agent, or Firm* — My Patent Guys; Christopher Pilling

(57)    ABSTRACT

A yellow jacket bait bottle is provided and designed for effective and safe extermination of yellow jacket populations. The device comprises a cylindrical container with a hollow interior, accessible through a tamper-resistant lid featuring a hinge and flange for easy opening and closing. A plurality of access holes around the container's perimeter allows yellow jackets to enter, collect poisoned bait, and exit freely. The bait bottle includes a central hole in the lid for a flexible loop, enabling the device to be hung in various locations. The method involves placing a pesticide-laced attractant inside the container, hanging the bait bottle, and allowing yellow jackets to transport the bait back to their nest, thereby eliminating larvae and reducing the population.

5 Claims, 6 Drawing Sheets

201

203

YELLOW JACKET BAIT BOTTLE SYSTEM AND METHOD

CROSS-REFERENCE TO RELATED APPLICATIONS

The present application is a continuation in part application of U.S. Design patent application Ser. No. 29/895,521 filed on Jun. 22, 2023, the disclosure of which is hereby incorporated in its entirety at least by reference.

BACKGROUND OF THE INVENTION

1. Field of the Invention

The present invention relates generally to yellow jacket control but more particularly to a yellow jacket bait bottle system and method.

2. Description of Related Art

Yellow jackets are a common nuisance in many residential and commercial areas. Traditional methods for controlling yellow jacket populations include traps that capture and kill individual insects. However, these methods are often inefficient as they do not address the root of the problem—the nest and the larvae within it. Existing traps can also pose risks to non-target species and may require frequent maintenance or replacement.

Some bait stations have been designed to allow yellow jackets to enter, consume poisoned bait, and exit, with the intention that they will return to their nest and spread the poison. However, many of these devices are complex, expensive, or not user-friendly. They may also fail to prevent unauthorized access to the toxic bait, posing safety risks to children, pets, and wildlife.

Therefore, there is a need for a simple, cost-effective, and safe device that allows yellow jackets to collect poisoned bait and transport it back to their nest, effectively targeting the entire colony while minimizing risks to non-target organisms.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present invention is to provide an effective and user-friendly solution for controlling yellow jacket populations, wherein the invention includes specific design features and safety mechanisms, to ensure ease of use while minimizing risks to non-target organisms and the environment.

In order to do so, in one aspect of the invention, a yellow jacket bait bottle is provided, comprising a cylindrical container having a hollow interior, a bottom surface, and a top portion forming an opening; a tamper resistant lid connected to the top portion of the container; a plurality of access holes around the cylindrical perimeter of the container, each access hole sized to allow a yellow jacket to enter the hollow interior; a hole in a central portion of the tamper-resistant lid; a flexible loop passing through the hole in the lid for hanging the bait bottle.

In one embodiment, the tamper-resistant lid includes a hinge element and a flange opposite the hinge element and the tamper-resistant lid is openable by squeezing the sides of the cylindrical container to release a tension fit. In one embodiment, the flexible loop is a metal barbed elastic string approximately 9.5 to 13 inches in length. In another embodiment, the container and lid are made from a durable, weather-resistant plastic material suitable for outdoor use. In one embodiment, the container is sized with an outside diameter of approximately 1.27 inches and a height to the top portion of approximately 2.29 inches, and the lid has a cap height of approximately 0.38 inches and a cap width including the flange and hinge of approximately 1.49 inches. In one embodiment, the access holes have a diameter of approximately 0.5 inches and are positioned approximately ⅜ inch down from the top of the container.

In yet another aspect of the invention, a method for controlling yellow jacket populations is provided, comprising steps (a) providing a bait bottle comprising a container having a hollow interior, a bottom surface, and a top portion forming an opening accessible via a tamper-resistant lid; the tamper-resistant lid being openable and closeable, and including a hinge element and a flange opposite the hinge element to facilitate opening; a plurality of access holes around the perimeter of the container, each access hole sized to allow a yellow jacket to enter the hollow interior, the access holes positioned towards the top portion of the container; a hole in a central portion of the tamper-resistant lid; a flexible loop passing through the hole in the tamper-resistant lid for hanging the bait bottle; (b) opening the tamper-resistant lid of the bait bottle; (c) placing a bait material comprising a chemical pesticide mixed with an attractant food into the hollow interior of the container; (d) closing the tamper-resistant lid securely to prevent unauthorized access to the bait material; (e) hanging the bait bottle in a suitable location frequented by yellow jackets using the flexible loop; and (f) allowing yellow jackets to enter the bait bottle through the access holes, collect the bait material, and exit the container; whereby the yellow jackets transport the bait material back to their nest, leading to the extermination of the larvae and reduction of the yellow jacket population.

In one embodiment, the attractant food is selected from the group consisting of cat food, meat scraps, or other protein-rich substances attractive to yellow jackets. In one embodiment, the tamper-resistant lid includes a child-proof locking mechanism requiring simultaneous squeezing and twisting to open. In one embodiment, the flexible loop is a metal barbed elastic string of sufficient length to hang the bait bottle in a desired location.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a yellow jacket bait bottle system and method.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having" as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
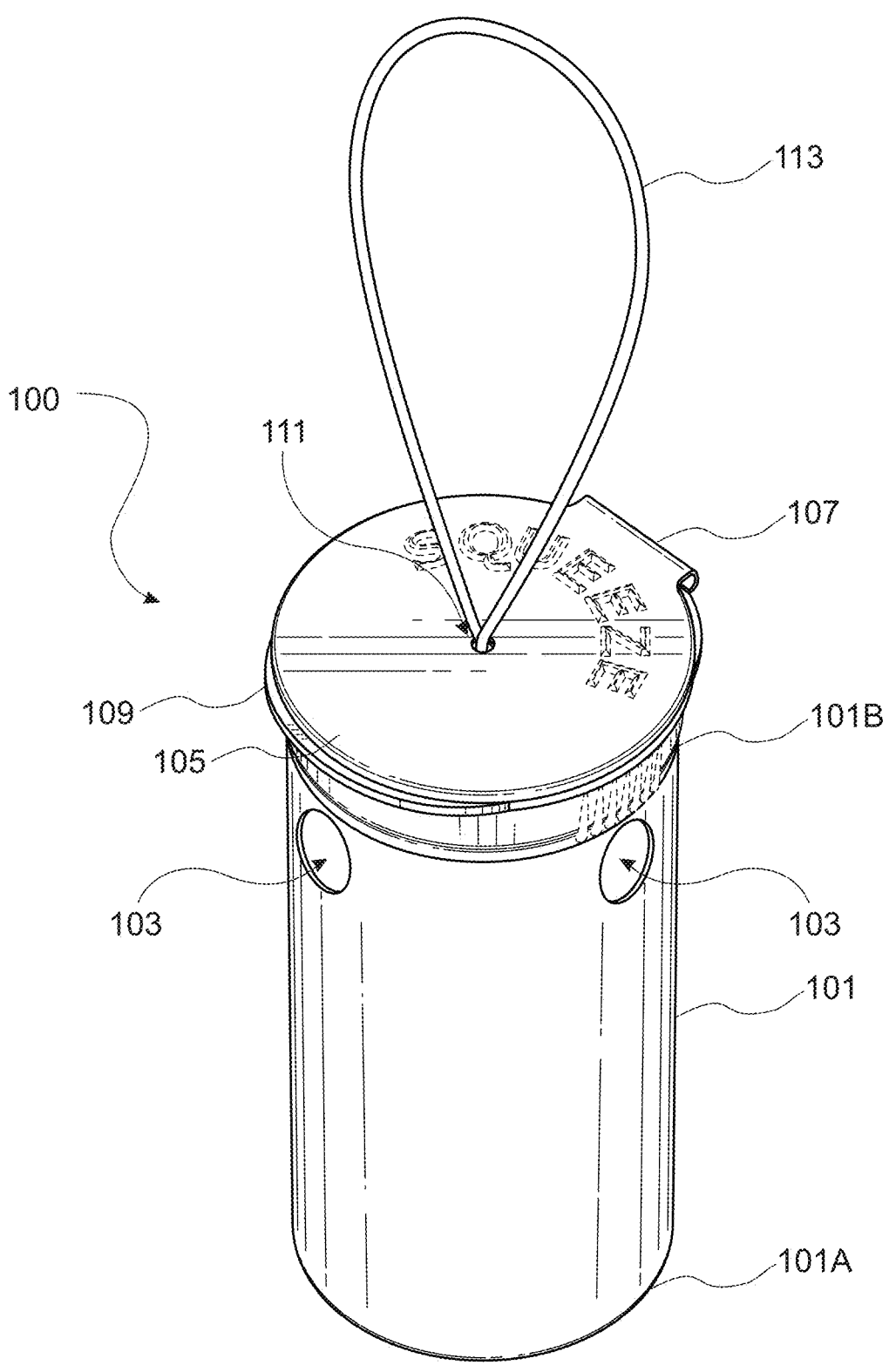
FIG. 1 is a perspective view of the yellow jacket bait bottle according to an embodiment of the present invention.
Figure 2:
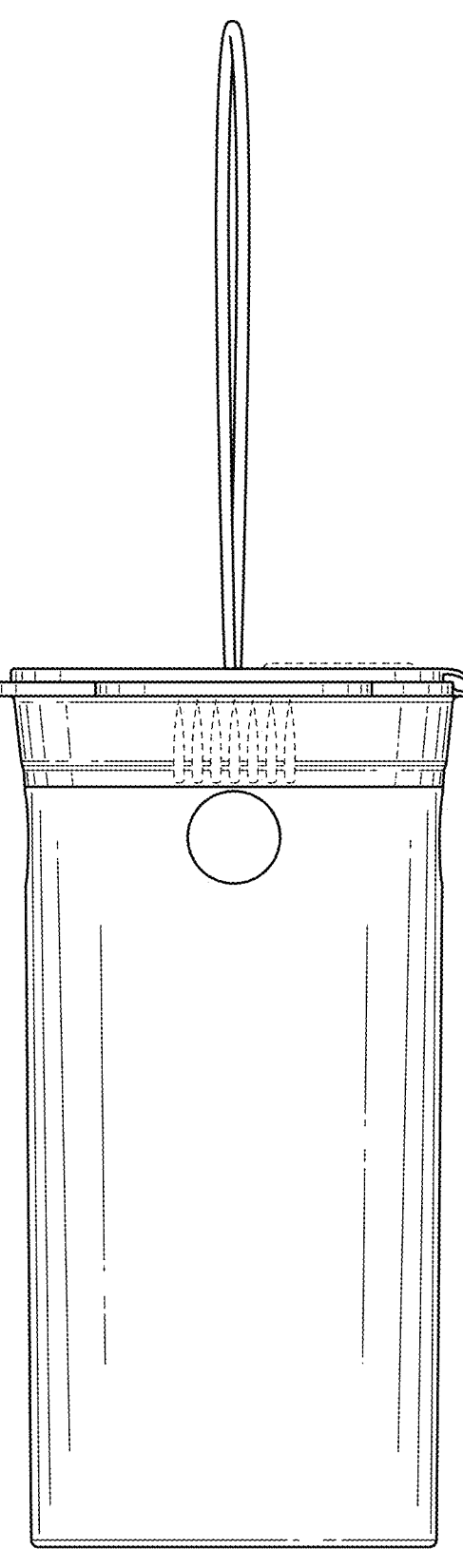
FIG. 2 is a side view of the yellow jacket bait bottle according to an embodiment of the present invention.
Figure 3:
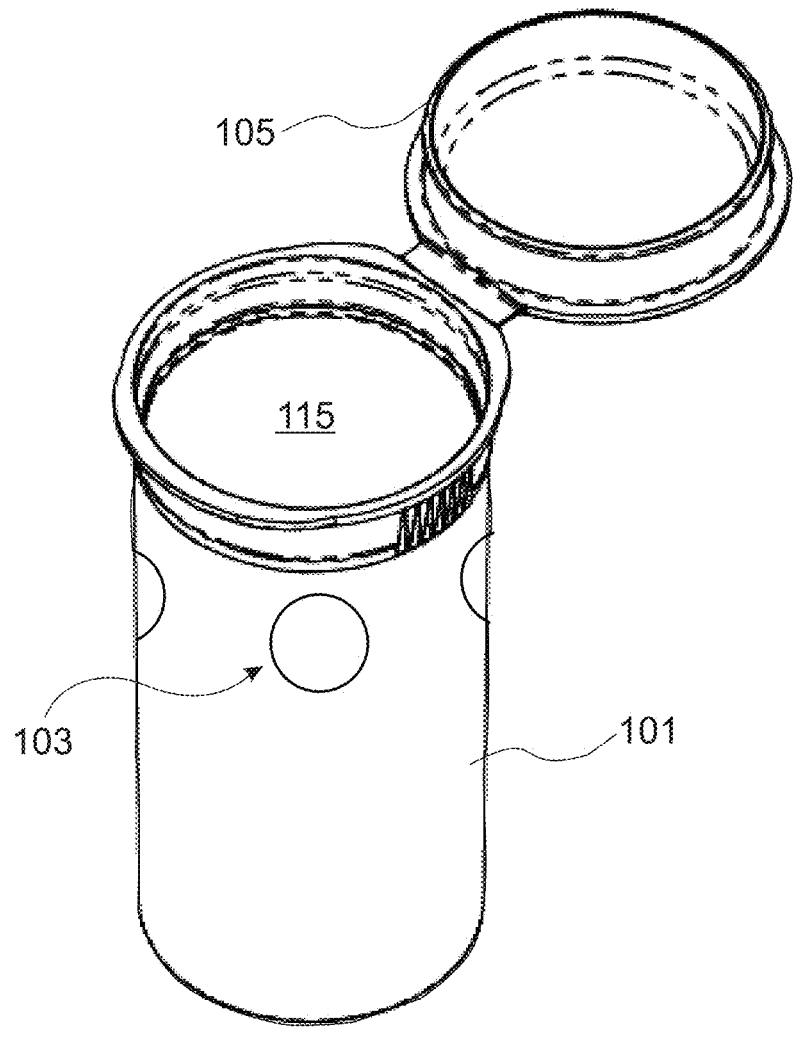
FIG. 3 is a perspective view of the yellow jacket bait bottle with the lid in an open position according to an embodiment of the present invention.
Figure 4:
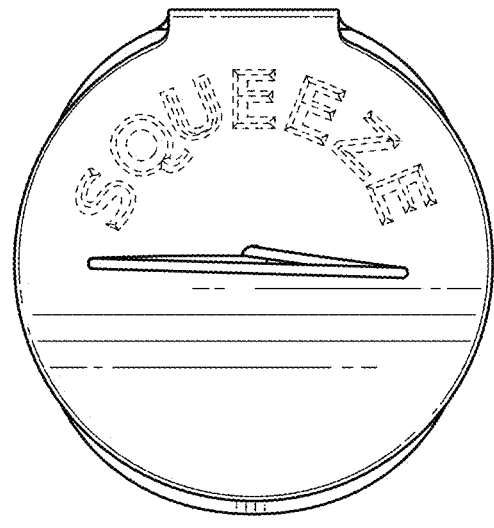
FIG. 4 is a top view of the yellow jacket bait bottle according to an embodiment of the present invention.
Figure 5:
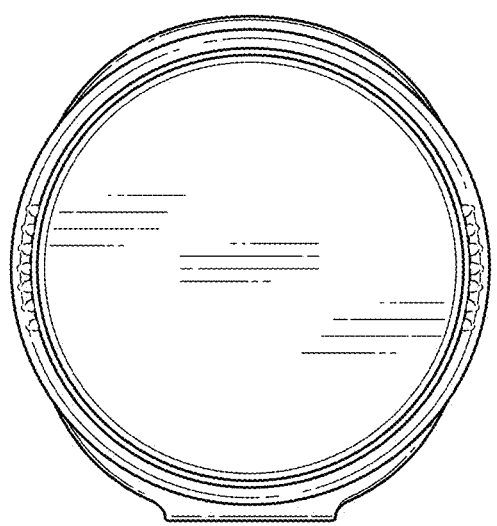
FIG. 5 is a bottle view of the yellow jacket bait bottle according to an embodiment of the present invention.

Referring now to the accompanying FIGS. 1-5, the yellow jacket bait bottle 100 comprises a cylindrical container 101 having a hollow interior 115. In one embodiment, the cylindrical container is generally uniform in diameter from a bottom surface 101A to a top portion 101B forming an opening, which is accessible via a lid 105.

In one embodiment, the cylindrical container 101 has specific dimensions to optimize its functionality. The bottom portion of the cylinder has an outside diameter of approximately 1.27 inches (32.3 mm) and a height to the top portion 101B of approximately 2.29 inches (58.1 mm). The total height of the container, including the lid 105, is approximately 2.76 inches (70.1 mm).

Advantageously, the lid 105 is a tamper-resistant lid and includes a hinge element 107, allowing the lid to pivot about a portion of the top portion 101B of the cylindrical container. The cap height is approximately 0.38 inches (9.5 mm), and the cap width, including the flange 109 and hinge 107, is approximately 1.49 inches (37.8 mm). A ridge or flange 109 is provided on the opposite edge from the hinge element 107, enabling a user to open the lid during use. In some embodiments, the tamper-resistant action requires the user to also squeeze the cylindrical container 101 at the same time making the lid difficult for children to open which will be described in further details below.

In some embodiments, a hole 111 is provided in a central portion of the lid 105, allowing for a loop of flexible material 113 to hold the present invention in position during use. In one embodiment, the hole 111 is approximately 4 mm in diameter. These holes are effectively sized to allow yellow jackets to enter the containter of the bait bottle. The loop 113 is a metal barbed elastic string approximately 9.5 to 13 inches (241 to 330 mm in length, which enables the bait bottle to be hung in a suitable location.

As previously mentioned, in some embodiments, the lid 105 is openable by squeezing the sides of the cylindrical container 101, which allows the tension fit of the lid to be released, as is well known in the art. Alternative methods of lid types may be used without departing from the scope of the invention, including but not limited to snap-fit lids, tabs, zippers, or other known systems, preferably with a locking system. The lid 105 acts as a tamper-resistant lid, which is important to prevent unauthorized users (such as children) from accessing the toxic bait material used in the invention.

A critical aspect of the invention is the provision of a plurality of access holes 103 around the cylindrical perimeter of the container 101. The access holes are sized to allow a flying insect, preferably a yellow jacket, to enter the hollow portion 115 of the cylindrical container. In one embodiment, there are four access holes 103, each with a diameter of approximately 0.5 inches (12.70 mm). These holes are positioned towards the top portion 101B of the container, approximately ⅜ inch (9.53 mm) down from the top of the bottle. This placement enables room for a user to add bait while providing easy access for the yellow jackets.

In some embodiments, the bait bottle and components are constructed of plastic material, although similar materials may be used. While a cylindrical container is illustrated, other shapes may be provided without departing from the scope of the invention. In some embodiments, the bait bottle is made from a durable, weather-resistant plastic material that can withstand outdoor environmental conditions, including UV exposure and temperature fluctuations.

Method of Use

Figure 6A:
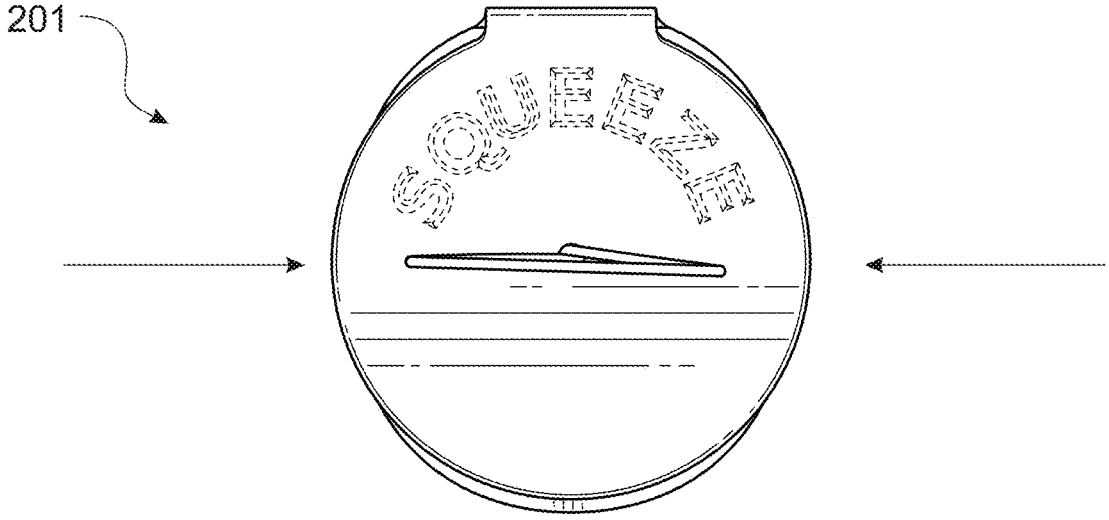
FIGS. 6A-D illustrate a method of using the yellow jacket bait bottle according to an embodiment of the present invention.
Figure 6B:
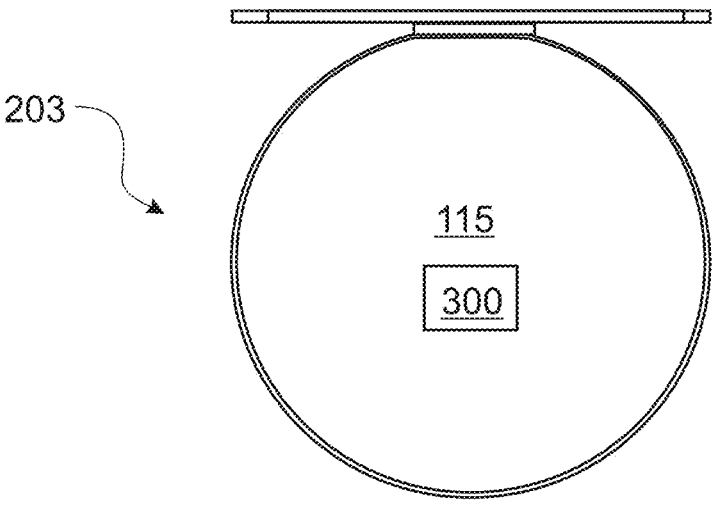
Figure 6C:
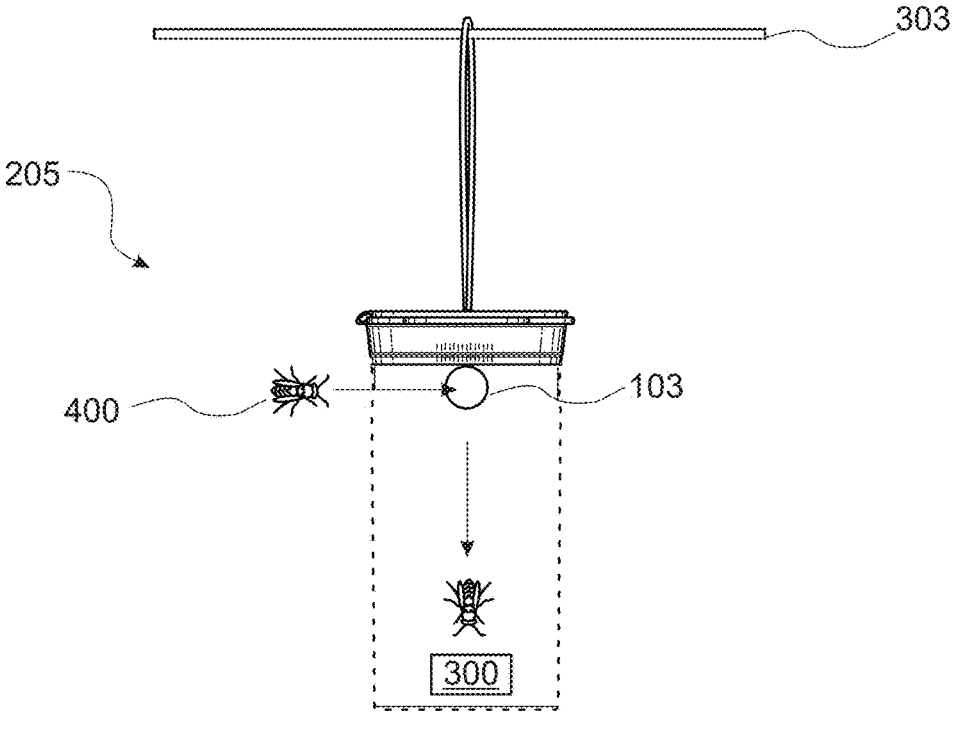
Figure 6D:
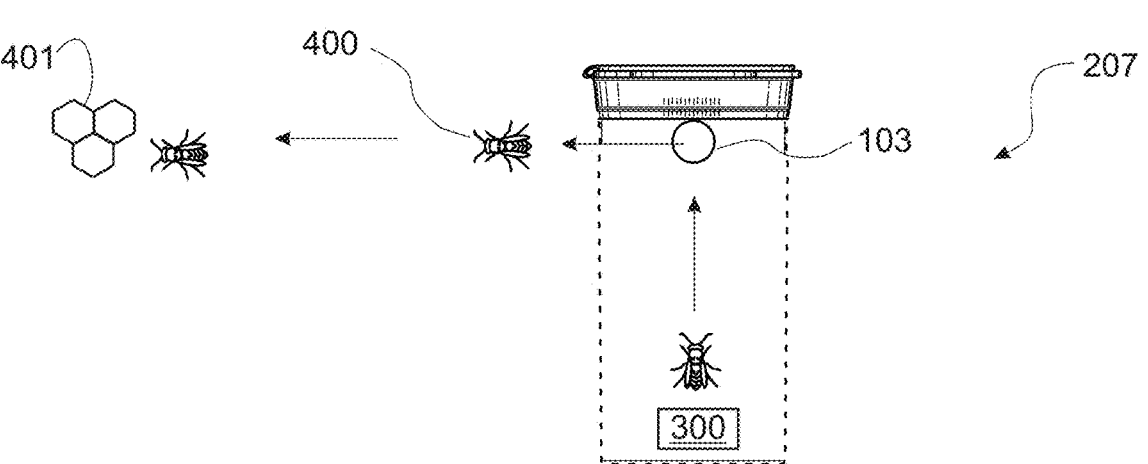

Referring now to FIGS. 6A-D, a method of using the yellow jacket bait bottle according to an embodiment of the present invention is provided.

Step 201 (FIG. 6A): The user squeezes the sides of the cylindrical container 103 to release the tension fit and open the tamper-resistant lid 105 in a manner described above. In other embodiments, the lid may be opened via any method or technique known in the art based on the type of lid provided.

Step 203 (FIG. 6B): Bait 300 is placed in the hollow interior 115 of the container. In one embodiment, the bait is a chemical pesticide mixed with a food that the intended target (yellow jackets) is attracted to, such as cat food.

Step 205 (FIG. 6C): The lid 105 is closed, and using the loop 113, the bait bottle is hung in a suitable location via a mounting bar 303, nail, or other support. This setup allows one or more yellow jackets 400 to enter one of the plurality of access holes 103 and access the bait material 300. It is important that there are no obstructions within the container that would make it difficult for the yellow jacket 400 to access the bait.

Step 207 (FIG. 6D): The yellow jacket 400 takes the bait material 300 back to the larvae in their nest 401, effectively killing off the larvae before they have a chance to mature. This method is effective in controlling the yellow jacket population in a particular area, such as around a home or business.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and so fourth members throughout the disclosure (and in particular, claims) are not used to show a serial or numerical limitation but instead are used to distinguish or identify the various members of the group.

What is claimed is:

1. A method for controlling yellow jacket populations comprising steps:
   (a) providing a bait bottle comprising a container having a hollow interior, a bottom surface, lower portion, and a top portion forming an opening accessible via a tamper-resistant lid; the tamper-resistant lid being openable and closeable, and including a hinge element and a flange opposite the hinge element to facilitate opening; a plurality of access holes around the perimeter of the container each access hole sized to allow a yellow jacket to enter the hollow interior, the access holes positioned towards the top portion of the container and the lower portion of the container being devoid of access holes; a hole in a central portion of the tamper-resistant lid; a flexible loop passing through the hole in the tamper-resistant lid for hanging the bait bottle;
   (b) opening the tamper-resistant lid of the bait bottle;
   (c) placing a bait material comprising a chemical pesticide mixed with an attractant food into the hollow interior of the container;
   (d) closing the tamper-resistant lid securely to prevent unauthorized access to the bait material;
   (e) hanging the bait bottle in a suitable location frequented by yellow jackets using the flexible loop;
   (f) allowing yellow jackets to enter the bait bottle through the access holes, collect the bait material, and exit the container; whereby the yellow jackets transport the bait material back to their nest, leading to the extermination of the larvae and reduction of the yellow jacket population.

2. The method of claim 1, wherein the attractant food is selected from the group consisting of cat food, meat scraps, or other protein-rich substances attractive to yellow jackets.

3. The method of claim 1, wherein the tamper-resistant lid includes a child-proof locking mechanism requiring simultaneous squeezing and twisting to open.

4. The method of claim 1, wherein the flexible loop is a metal barbed elastic string of sufficient length to hang the bait bottle in a desired location.

5. The method of claim 1, wherein the container is configured to be free of obstructions that would limit access to the bait material.

* * * * *